US007842365B2

(12) United States Patent
Riggs

(10) Patent No.: US 7,842,365 B2
(45) Date of Patent: Nov. 30, 2010

(54) RESEALABLE LABEL FLAP AND BASE MATERIAL

(76) Inventor: Jon M. Riggs, N1 W33844 Abitz Rd., Oconomowoc, WI (US) 53066

( * ) Notice: Subject to any disclaimer, the term of this patent is extended or adjusted under 35 U.S.C. 154(b) by 882 days.

(21) Appl. No.: 11/425,291

(22) Filed: Jun. 20, 2006

(65) Prior Publication Data

US 2007/0087152 A1 Apr. 19, 2007

Related U.S. Application Data

(60) Provisional application No. 60/727,669, filed on Oct. 18, 2005.

(51) Int. Cl.
*B32B 33/00* (2006.01)

(52) U.S. Cl. .................... 428/41.8; 428/40.1; 428/41.9; 229/123.2; 229/125.15; 220/359.1; 220/359.2

(58) Field of Classification Search ................. 206/494; 220/62.2, 523, 229, 254.1, 255, 255.1, 257.1, 220/257.2, 258.1, 258.2, 258.3, 258.4, 258.5; 221/22, 23, 38, 66, 154, 305, 306; 222/92, 222/93, 107; 229/123.1, 123.2, 125.04, 125.15, 229/125.1, 124, 247, 209; 383/86, 203, 81; 428/40.1, 41.8, 41.9, 42.1, 42.2, 42.3, 43, 428/34.1, 343; 53/376.3; 99/523
See application file for complete search history.

(56) References Cited

U.S. PATENT DOCUMENTS

| | | | | | |
|---|---|---|---|---|---|
| 3,925,585 | A | * | 12/1975 | Aoyagi | 428/42.3 |
| 4,260,061 | A | * | 4/1981 | Jacobs | 383/203 |
| 5,688,394 | A | * | 11/1997 | McBride et al. | 206/233 |
| 6,001,471 | A | * | 12/1999 | Bries et al. | 428/343 |
| 6,113,271 | A | * | 9/2000 | Scott et al. | 383/211 |
| 6,126,009 | A | * | 10/2000 | Shiffler et al. | 206/494 |
| 6,589,622 | B1 | | 7/2003 | Scott | |
| 2003/0036489 | A1 | * | 2/2003 | Liu et al. | 510/100 |
| 2004/0121106 | A1 | * | 6/2004 | Cobeiros et al. | 428/42.3 |

* cited by examiner

*Primary Examiner*—David R Sample
*Assistant Examiner*—Walter Moore
(74) *Attorney, Agent, or Firm*—Andrus, Sceales, Starke & Sawall, LLP

(57) ABSTRACT

A sealing system positionable to cover an opening in a package body covering removable articles includes a base material and a resealable label flap. The base material is permanently attached to the package body and formed with a die cut line surrounding the opening in the package body and defines a movable blank. The base material has a back surface provided with a permanent adhesive provided with a deadened area covering the blank and extending beyond the die cut lie. The resealable label flap is positioned on the base material to cover the opening in the packaged body and the die cut line. The resealable flap has a back surface provided with a resealable adhesive that permits repeated application and removal of the label flap relative to the base material.

10 Claims, 2 Drawing Sheets

RESEALABLE LABEL FLAP AND BASE MATERIAL

CROSS-REFERENCE TO RELATED APPLICATION

This application relates to and claims priority based on U.S. Provisional Patent Application Ser. No. 60/727,669 filed Oct. 18, 2005.

BACKGROUND OF THE INVENTION

The present invention relates to a resealable label flap that is positionable to cover an opening in a product package containing removable articles such that the label flap can be repeatedly removed and reapplied to access the articles contained within the package. More specifically, the present invention relates to a label flap attached to a section of base material such that the base material can be applied to the product package to provide a surface for resealing of the removable label flap.

Resealable sealable label flaps are commonly used with product packages that include packaged-like removable articles that have been wetted with a liquid prior to packaging. Typically, the product package is constructed from a flexible material that has an opening over which the label flap is removably adhered. The label flap includes a removable pressure-sensitive adhesive applied to one surface of the label such that the removable adhesive creates a generally air-tight seal around the package opening to prevent either the articles from drying out or contaminants from entering into the product package.

In typical applications for resealable flaps, the product packaging is formed from a material to which the resealable adhesive contained on the back surface of the label flap can make a fluid and airtight seal. However, the use of resealable label flaps with a certain type of product packaging, such as corrugated cardboard and paperboard cartons, prevents the resealable adhesive from making good contact with the product package. Therefore, resealable label flaps have not found broad use in certain types of product packaging, such as with corrugated cardboard or paperboard packages.

Therefore, it is an object of the present invention to provide a resealable label flap system that allows the label flap to form a liquid and airtight seal when used with corrugated or paperboard packaging. It is an additional object of the invention to provide a resealable label flap that is easy to manufacture using conventional label forming machinery.

SUMMARY OF THE INVENTION

The present invention relates to a sealing system for use with product packages, specifically those formed from corrugated cardboard. The sealing system includes a base material that is a film with a permanent pressure sensitive adhesive applied to the back surface. An area of the permanent pressure sensitive adhesive is deadened along the back surface of the base material. The deadened area is larger than the opening formed in the container or product package. The base film is then die cut to create an opening. However, the blank formed within the die cut remains attached to the base area. The die cut area is within the deadened portion of the base material.

A peel and resealable label flap is then applied to the top surface of the base material over the die cut. When the base material with the die cut and a label flap are applied to a container or product package, the peel and reseal label flap can be peeled back from the top surface of the base material to provide access to the interior of the container or product package. The surface of the base film and the type of resealable adhesive used on the back surface of the label flap can be selected and controlled to ensure that the reseal function works correctly for the application. The base film and permanent adhesive contained on the back surface of the base film can also be selected to ensure compatibility with the product being packaged.

As described above, the sealing system includes a resealable label flap that is attached to a section of base material, such as backing tape. The resealable label flap forms a liquid and airtight seal with the base material. The permanent adhesive on the back surface of the base material allows the base material to be applied to the product package. Thus, the use of the base material allows a resealable label flap to be used on product packages that otherwise present significant difficulties in the use of a resealable label flap.

BRIEF DESCRIPTION OF THE DRAWINGS

The drawings illustrate the best mode presently contemplated of carrying out the invention. In the drawings.

DETAILED DESCRIPTION OF THE PREFERRED EMBODIMENT

Figure 1:
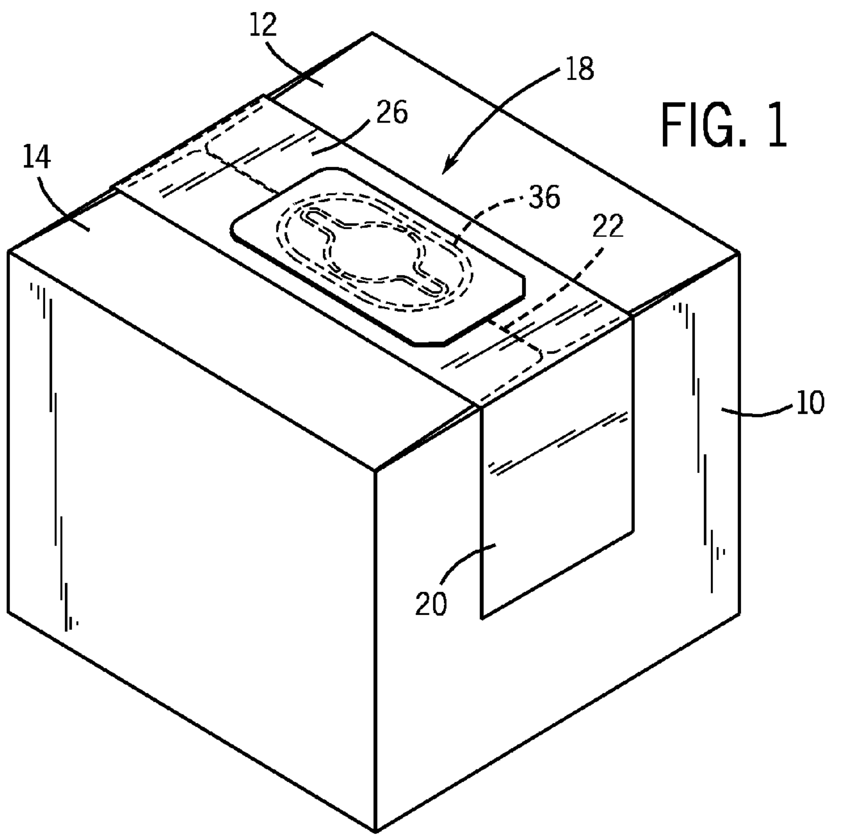
FIG. 1 is a perspective view of a product package formed from corrugated cardboard that includes the sealing system including the resealable label flap and base material.
Figure 2:
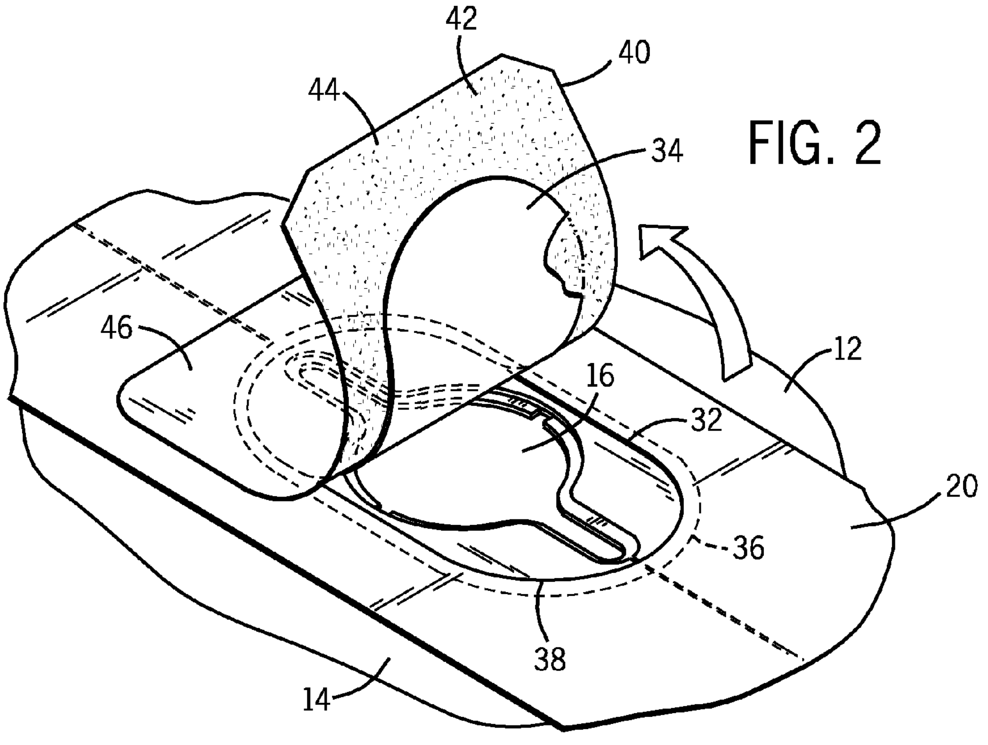
FIG. 2 is a perspective view illustrating the removal of the resealable label flap from the base material to expose the opening within the corrugated package.

Referring first to FIG. 1, thereshown is a product package 10 used to contain a series of items that are sequentially removed from the product package. In the embodiment of the invention illustrated, the product package 10 is a corrugated box having first and second top flaps 12,14 that close the otherwise open interior of the product package. As illustrated in FIG. 2, when the top flaps 12,14 are in the closed position, an opening 16 allows product to be removed from the interior of the product package without reopening the top flaps 12,14.

Figure 3:
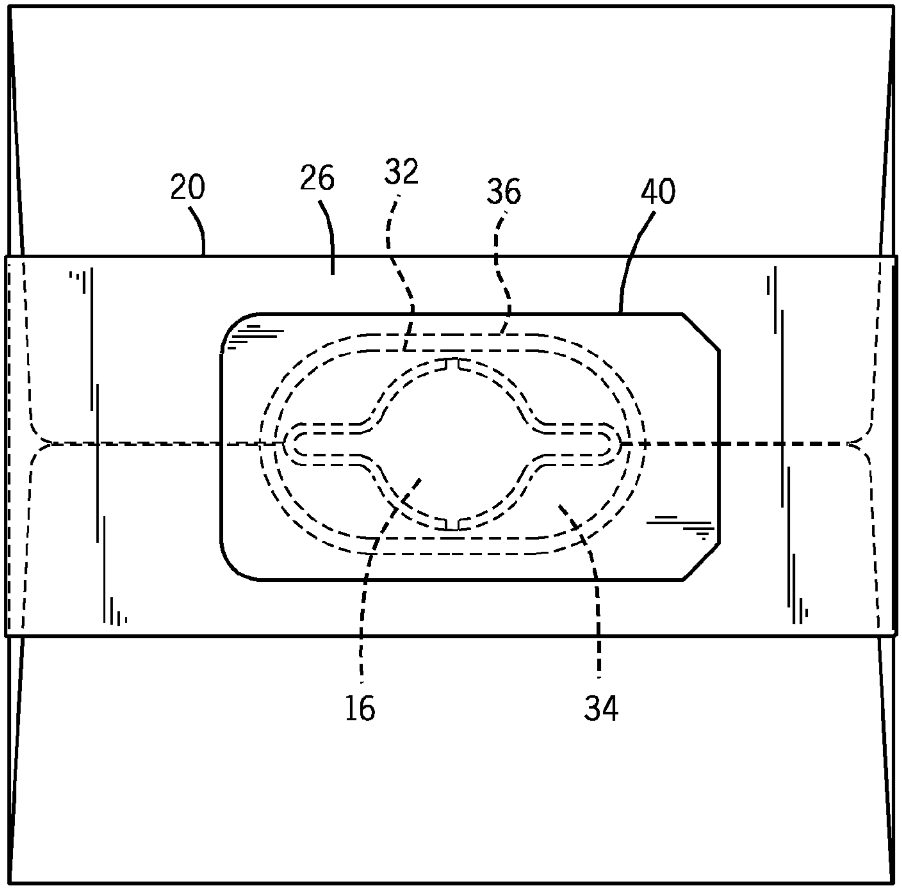
FIG. 3 is a top view illustrating the resealable label flap positioned over the opening in the product package.

In the embodiment of the invention illustrated in FIGS. 1 and 3, the product package 10 is formed from a corrugated cardboard material that has a generally unfinished top surface. The unfinished top surface of the corrugated cardboard prevents the use of a resealable label flap directly over the opening 16. As can be understood, if a resealable label flap is positioned directly onto the top surface of the top flaps 12,14, pieces of the corrugated cardboard become attached to the resealable adhesive and prevent the repeated attachment and reattachment of the label flap. Therefore, the sealing system 18 of the present invention was designed.

As illustrated in FIG. 1, the sealing system 18 includes a section of base material 20 that is applied to the product package over the seam 22 formed between the top flaps 12,14. Preferably, the base material 20 is a section of backing tape that has a generally smooth top surface 26 and a permanent, pressure sensitive adhesive 28 applied to the back surface 30. The permanent, pressure sensitive adhesive 28 functions to permanently hold the base material 20 to the product package 10. The pressure sensitive permanent adhesive 28 is a conventional substance used to adhere tape to product packages formed from corrugated cardboard and similar materials.

Figure 4:
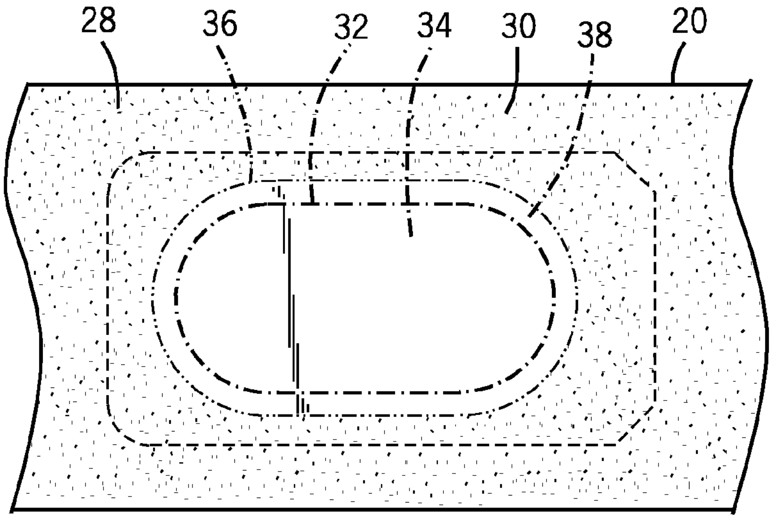
FIG. 4 is a back view of the base material illustrating the die cut blank and deadened portion of the adhesive on the back surface of the base material.

Referring now to FIG. 4, thereshown is a back view of the base material 20. The base material 20 includes the permanent adhesive 28 over the entire back surface 30. The base material 20 includes a die cut line 32 that creates a removable blank 34. In addition, a section of the permanent adhesive 28 is deadened within the area defined by line 36 to form a deadened portion. Typically, the deadened portion 34 is created by applying a non-adhesive or non-stick material over the permanent adhesive 28 to prevent the permanent adhesive 28 from adhering to the product package 10. As illustrated in FIG. 4, a deadened strip 38 is created between the line 36 and the die cut line 32 which includes all of the removable blank 34 plus the deadened area defined by line 36.

As illustrated in FIG. 3, a resealable label flap 40 is applied to the top surface 26 of the base material 20 such that the resealable label flap 40 is positioned over the die cut line 32. As illustrated in FIG. 2, the resealable label flap 40 includes a resealable adhesive 42 applied to the back surface 44. Preferably, the resealable adhesive 42 allows the label flap 40 to be repeatedly peeled from the base material 20 and reapplied thereto. The resealable adhesive 42 contained on the resealable label flap 40 generally retains its adhesive properties during repeated applications and removal of the label flap 40 from the base material 20. One end 46 of the label flap 40 along its back surface 44 includes a much stronger permanent adhesive than resealable adhesive 42 that prevents complete separation of the label flap 40 from the base material 20 during normal usage of the label flap 40.

In a preferred embodiment of the invention, the label flap 40 is applied to the base material 20 prior to the application of the base material 20 to the product package 10. The use of the sealing system 18 requires that the product package 10 be first closed so that the top flaps 12 and 14 close the top of the product package, as illustrated in FIG. 1. Once the top of the product package is closed, the base material 20 is applied to the package such that the deadened portion 36 is centered over the opening 16, as shown in FIG. 3. When the base material is applied as shown in FIG. 3, the entire opening 16 is positioned beneath the blank 34 defined by the die cut line 32.

When the resealable label flap 40 is removed from the base material 20 for the first time, as shown in FIG. 2, the resealable adhesive 42 separates from the top surface of the base material 20. However, since the permanent adhesive 28 beneath the blank 34 is deadened, the blank 34 remains attached to the back surface 44 of the label flap 40 and separates along the die cut line 32. Since the permanent adhesive 28 on the back surface 30 of the base material 20 is deadened only within the area defined by the dashed line 36, the remaining portions of the base material 20 remains securely attached to the top surface of the product package 10. The deadened strip 38 aids in separating the blank 34 from the remaining portions of the base material 20.

As the resealable label flap 40 is pulled further back, the label flap 40 exposes the entire opening 16 within the product package 10. Once the opening 16 is exposed, package materials can be removed from the product package 10. Once the desired number of products has been removed, the resealable label flap 40 is again moved into contact with the top surface 26 of the base material 20. As the label flap 40 is moved back into contact with the base material 20, the blank 34 again covers the entire opening 16 and the resealable adhesive 42 creates an air and water impermeable seal around the opening 16.

Various alternatives and embodiments are contemplated as being within the scope of the following claims particularly pointing out and distinctly claiming the subject matter regarded as the invention.

I claim:

1. A sealing assembly covering an opening provided in a package body containing removable articles, the sealing assembly comprising:

a base material separate from and fixedly attached to a portion of the package body in covering relationship to the opening and having a cut line defining a blank completely removable from the base material to define a hole aligned with the opening in the package body, the blank covering the opening in the package body, the base material having a back surface provided with a first adhesive permanently holding the base material to the package body and preventing separation of the base material from the package body should a pulling force be applied to the base material, the base material including a deadened area covering the entire blank and extending beyond the cut line to prevent the attachment of the blank to the package body; and a resealable label flap engageable with an upper surface of the base material and completely overlying at least the cut line, the resealable flap having a back surface provided directly thereon with a second adhesive that permits repeated application of the label flap directly upon the upper surface of the base material, and permits repeated removal of the label flap directly from the upper surface of the base material, wherein one end of the label flap back surface is provided with a third adhesive preventing the complete removal of the label flap from the base material, the third adhesive having an adhesive strength stronger than the second adhesive.

2. The sealing assembly of claim 1, wherein the resealable label flap forms a liquid and airtight seal with the base material.

3. The sealing assembly of claim 1, wherein the deadened area is covered with a non-adhesive material.

4. A resealable package comprising:

a package body having an opening provided therein for accessing a plurality of removable articles contained therein;

a base material separate from and fixedly attached to a portion of the package body in covering relationship to the opening and having a cut line defining a blank completely removable from the base material to define a hole aligned with the opening in the package body, the blank covering the opening in the package body, the base material having a back surface provided with a first adhesive permanently holding the base material to the package body and preventing separation of the base material from the package body should a pulling force be applied to the base material, the base material including a deadened area covering the entire blank and extending beyond the cut line to prevent the attachment of the blank to the package body; and a resealable label flap positioned on a top surface of the base material to cover at least the opening in the package body and the cut line, the resealable flap having a back surface provided directly thereon with a second adhesive that permits repeated application and removal of the label flap relative to the base material, whereby, upon applying a pulling force to effect removal of the label flap from the base material, the blank remains completely attached to the back surface of the label flap and the opening in the package body is exposed to enable removal of the articles in the package, after which, the label flap is resealed against the base material so that the blank covers the opening and the second adhesive creates an impermeable fluid-tight seal around the opening, and wherein one end of the label flap back surface includes a third adhesive preventing complete removal of the label flap from the base material, the third adhesive having an adhesive strength stronger than the second adhesive.

5. The resealable package of claim 4, wherein the package body is comprised of a material having a top surface to which the base material is attached, the top surface surrounding the opening in the package body and preventing repeated attachment and reattachment of the label flap relative to the package body.

6. The resealable package of claim 4, wherein the deadened area is covered with a non-adhesive material.

7. The resealable package of claim 4, wherein a deadened strip is created between a periphery of the deadened area and the cut line.

8. The resealable package of claim 7, wherein the deadened strip aids in separating the blank from the base material by reducing the pulling force required on the label flap around the cut line.

9. The resealable package of claim 4, wherein the package body includes a pair of flaps closable along a seam extending through the opening in the package body.

10. The resealable package of claim 9, wherein the base material is attached over the seam such that the deadened area is centered over and covers the opening in the package body.

* * * * *